United States Patent
Park et al.

(10) Patent No.: US 9,848,398 B2
(45) Date of Patent: Dec. 19, 2017

(54) SCHEDULING METHOD BETWEEN TERMINALS FOR SEARCH RESOURCE ALLOCATION IN DIRECT DEVICE TO DEVICE COMMUNICATION AND DEVICE THEREOF

(71) Applicant: Samsung Electronics Co., Ltd, Gyeonggi-do (KR)

(72) Inventors: Seunghoon Park, Seoul (KR); Hyunseok Ryu, Gyeonggi-do (KR); Chiwoo Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/038,028

(22) PCT Filed: Dec. 12, 2014

(86) PCT No.: PCT/KR2014/012290
§ 371 (c)(1),
(2) Date: May 19, 2016

(87) PCT Pub. No.: WO2015/088287
PCT Pub. Date: Jun. 18, 2015

(65) Prior Publication Data
US 2016/0302053 A1    Oct. 13, 2016

(30) Foreign Application Priority Data

Dec. 12, 2013  (KR) .......................... 10-2013-0154986
Mar. 25, 2014  (KR) .......................... 10-2014-0034934

(51) Int. Cl.
*H04W 92/18*    (2009.01)
*H04W 56/00*    (2009.01)
(Continued)

(52) U.S. Cl.
CPC ... *H04W 56/0025* (2013.01); *H04W 72/0446* (2013.01); *H04W 76/023* (2013.01)

(58) Field of Classification Search
CPC combination set(s) only.
See application file for complete search history.

(56) References Cited

U.S. PATENT DOCUMENTS

| 8,121,097 | B2 | 2/2012 | Li et al. |
| 9,042,938 | B2 * | 5/2015 | Nimbalker .......... H04W 72/048 455/550.1 |

(Continued)

FOREIGN PATENT DOCUMENTS

WO    WO 2012/150815 A2    11/2012

OTHER PUBLICATIONS

ZTE, "Discussion of D2D Discovery", 3GPP TSG-RAN WG1 #74, R1-133149, Barcelona, Spain, Aug. 19-23, 2013, 10 pages.

(Continued)

*Primary Examiner* — Cindy Trandai

(57) ABSTRACT

The present invention relates to a scheduling method between terminals for a search resource allocation in direct device to device communication and a device thereof. The present invention relates to, as a search resource allocation method of a terminal which performs device to device (D2D) communication, a proximity searching method and a device thereof, and the method comprises the steps of: transmitting and receiving a signal through a wireless resource determined so as to explicitly or implicitly transmit and receive a contention index of the terminal; selecting a search resource on the basis of a response signal when the response signal is received through the wireless resource; and performing a search for the D2D communication by using the selected search resource.

20 Claims, 12 Drawing Sheets

(51) Int. Cl.
   *H04W 72/04*   (2009.01)
   *H04W 76/02*   (2009.01)

(56) References Cited

U.S. PATENT DOCUMENTS

| | | | | |
|---|---|---|---|---|
| 9,084,241 | B2* | 7/2015 | Madan | H04W 76/023 |
| 2008/0112334 | A1 | 5/2008 | Laroia et al. | |
| 2010/0202400 | A1 | 8/2010 | Richardson et al. | |
| 2013/0109301 | A1* | 5/2013 | Hakola | H04W 76/023 |
| | | | | 455/39 |
| 2013/0322413 | A1* | 12/2013 | Pelletier | H04W 72/1289 |
| | | | | 370/336 |
| 2014/0328329 | A1* | 11/2014 | Novlan | H04W 72/042 |
| | | | | 370/336 |
| 2014/0355557 | A1* | 12/2014 | Peng | H04W 16/14 |
| | | | | 370/330 |
| 2015/0098416 | A1* | 4/2015 | Kuo | H04W 72/10 |
| | | | | 370/329 |
| 2015/0131566 | A1* | 5/2015 | Seo | H04B 1/3838 |
| | | | | 370/329 |
| 2015/0189642 | A1* | 7/2015 | Yang | H04W 76/023 |
| | | | | 370/311 |
| 2015/0215903 | A1* | 7/2015 | Zhao | H04W 72/04 |
| | | | | 370/329 |
| 2015/0264663 | A1* | 9/2015 | Chen | H04W 76/023 |
| | | | | 455/450 |
| 2016/0037323 | A1* | 2/2016 | Kim | H04W 8/005 |
| | | | | 370/329 |
| 2016/0183276 | A1* | 6/2016 | Marinier | H04W 72/02 |
| | | | | 370/329 |

OTHER PUBLICATIONS

ETRI, "Resource Allocation for D2D Discovery", 3GPP TSG-RAN WG1 Meeting #74bis, R1-134336, Guangzhou, China, Oct. 7-11, 2013, 4 pages.

KDDI, "Discussion About Resource Allocation Schemes for D2D Discovery", 3GPP TSG RAN WG1, R1-132211, May 20-24, 2013, 3 pages.

* cited by examiner

SCHEDULING METHOD BETWEEN TERMINALS FOR SEARCH RESOURCE ALLOCATION IN DIRECT DEVICE TO DEVICE COMMUNICATION AND DEVICE THEREOF

CROSS-REFERENCE TO RELATED APPLICATION(S)

The present application claims priority under 35 U.S.C. §365 to International Patent Application No. PCT/KR2014/012290 filed Dec. 12, 2014, entitled "SCHEDULING METHOD BETWEEN TERMINALS FOR SEARCH RESOURCE ALLOCATION IN DIRECT DEVICE TO DEVICE COMMUNICATION AND DEVICE THEREOF", and, through International Patent Application No. PCT/KR2014/012290, to Korean Patent Application No. 10-2013-0154986 filed Dec. 12, 2013 and to Korean Patent Application No. 10-2014-0034934 filed Mar. 25, 2014, each of which are incorporated herein by reference into the present disclosure as if fully set forth herein.

TECHNICAL FIELD

The present invention relates to a device-to-device (D2D) scheduling method of allocating discovery resources in direct communication between devices and an apparatus adapted to the method.

BACKGROUND ART

In recent years, data traffic has rapidly increased due to the increased use of smartphones. Smartphone users will continue to increase in number and application services using smartphones, such as SNS, game, etc., will also be more varied. Therefore, far more data traffic will also be required to cope with this increased demand. In particular, Machine-to-Machine communication using things, beyond communication between people, is expanding in mobile communication markets. Examples of the M2M communication are communication between human and things, communication between things, etc. When M2M communication is normally used, traffic transmitted to an eNB will increase to such an extraordinary extent so that it cannot by processed by the eNB.

In order to resolve these problems, a direct communication technology between devices, also called Device to Device (D2D) communication, has been created. The D2D communication technology is created by both a licensed band of mobile communication and an unlicensed band such as wireless LAN.

When D2D communication is combined with mobile communication, this is advantageous in that evolved Node B (eNB) increases traffic accommodation capability and reduces overload. In D2D communication, User Equipment (UE) devices, within the same cell or cells adjacent to each other, establish D2D links with each other and exchange data with each other, via the D2D links, without eNBs. Therefore, D2D communication can reduce the number of links from two to one.

Studies on D2D communication in an unlicensed band are to: detect requests created in Human-to-human communication, human-to-machine communication, and machine-to-machine communication; prevent wastage of unnecessary wireless resources; properly determine locally created traffic; and provide corresponding services. That is, D2D communication in an unlicensed band has been studied, focusing on a method for a number of devices to broadcast services and information regarding content and efficiently receive corresponding services and information.

Unlike existing ad-hoc/sensor networks, D2D communication devices first synchronize with each other and then perform discovery, pairing, scheduling, etc. Device-to-Device Synchronization allows devices performing D2D communication to: perform efficient transmission/reception of data or control signals; and configure an efficient protocol for scheduling. Existing communication techniques have difficulty in creating efficient distribution protocol to control networks without a master node; however, D2D communication allows devices to synchronize with each other, so that distributed devices can efficiently exchange control signals with each other, which can be considered distribution protocol.

Distribution scheduling refers to a method which is performed in such a way that allocation of resources is determined, depending on part of information in individual local areas, but not in such a way that one master obtains information regarding the entire network channel, etc. and allocates resources. Therefore, it is not easy to achieve the maximum scheduling capacity. Accordingly, a method is required to achieve the maximum efficiency and to minimize overhead by control signals when performing distribution scheduling.

Proximate discovery related to D2D communication has been implemented with various methods, e.g., a method using short-range communication or Over-The-Top (OTT). OTT refers to a method performed, based on existing Internet, in such a way that: an Application Service Provider (ASP) collects information related to services and locations via application programs of UE, performs a matching procedure to determine whether individual UE devices are located within a service receivable range, and informs the UE devices of information according to the matching result, thereby allowing the UE devices to perform discovery. A method using short-range communication, such as Wi-Fi, Bluetooth, or the like, is performed in such a way that: UE embedded with service discovery protocol performs proximate discovery, but networks do not control proximate discovery. The method using short-range communication has generally been used to establish a short-range connection.

The conventional OTT is a method suitable for discovering information regarding devices which are fixed in location. In OTT, mobile devices need to periodically transmit information regarding their locations and recognition information regarding users/services to a server, in order to identify locations of each other and search for related services, and to receive a related matching result from the server. Therefore, OTT requires a relatively large amount of network resources. In addition, since a mobile device needs to measure its location and transmit the measured location value to the server, it consumes electric power in the process of detecting its location using a second device, such as GPS, Wi-Fi, etc.

In order to resolve the problems described above, a system has recently been developed that has a fixed discovery repetition, considering a synchronous network based on GPS or cellular signals. Referring to FIG. 1, the system is implemented in such a way that: each of the discovery repetitions 101 and 103 is allocated a certain size of discovery intervals 105 and 113 and the resource within each of the discovery intervals 105 and 113 is configured with a number of discovery slots 107, 109, and 111 which have the same size. In order to select a discovery slot to be used for proximate discovery, UE observes a state of energy of transmission/reception signals of discovery slots 107, 109, and 111 during a discovery interval 105. After that, UE selects a discovery slot with a relatively low level of energy and transmits a discovery signal via the next discovery repetition 103.

The conventional system is operated in such a way that a new mobile communication system is allowed only after all mobile devices transmit discovery signals during the discovery interval and then the new mobile device detects states of energy of discovery slots and selects a discovery slot with low interference. However, in a real situation, discovery repetition varies according to types of services and all mobile devices may not transmit discovery signals during the discovery interval. Therefore, the system has a risk that may cause loss due to interference prediction error.

DISCLOSURE OF INVENTION

Technical Problem

The present invention has been made to address the above problems and disadvantages, and to provide at least the advantages described below. Accordingly, the present invention provides a method of selecting a resource with low interference, re-using resources in a network where discovery services of non-repetition or discovery services of various repetitions co-exist, despite a periodicity.

The present invention further provides a method of determining a discovery resource by performing an explicit D2D scheduling operation.

Since various embodiments of the present invention determine a discovery resource and broadcast discovery signals, the present invention can be applied to various broadcast-based services, not limited to discovery services.

Solution to Problem

In accordance with an aspect of the present invention, a method of allocating discovery resources in a terminal (User Equipment (UE) or a UE device) configured to perform Device-to-Device (D2D) communication is provided. The method includes: performing transmission/reception of signals via a wireless resource which is determined to explicitly or implicitly transmit and receive a contention index of the terminal; when a response signal is received through the wireless resource, selecting a discovery resource based on the response signal; and performing discovery to make D2D communication, using the selected discovery resource.

In accordance with another aspect of the present invention, a method of allocating discovery resources of a terminal (User Equipment (UE) or a UE device) configured to perform Device-to-Device (D2D) communication is provided. The method includes: receiving signals from a number of other terminals via a wireless resource selected based on a scheduling identifier received from a base station (eNB); transmitting a response signal to one or more other terminals, via the wireless resources, based on information contained in the received signals; and performing discovery to make D2D communication with one or more other terminals, using a discovery resource corresponding to the wireless resource.

In accordance with another aspect of the present invention, a terminal (User Equipment (UE) or a UE device) configured to perform Device-to-Device (D2D) communication is provided. The terminal includes: a communication unit for performing data communication with a base station (eNB) and other terminals; and a controller for controlling the communication unit to: perform transmission/reception of signals via a wireless resource which is determined to explicitly or implicitly transmit and receive a contention index of the terminal; select, when a response signal is received through the wireless resource, a discovery resource based on the response signal; and perform discovery to make D2D communication, using the selected discovery resource.

In accordance with another aspect of the present invention, a terminal (User Equipment (UE) or a UE device) configured to perform Device-to-Device (D2D) communication is provided. The terminal includes: a communication unit for performing data communication with a base station (eNB) and other terminals; and a controller for controlling the communication unit to: receive signals from a number of other terminals via a wireless resource selected based on a scheduling identifier received from the base station; transmit a response signal to one or more other terminals, via the wireless resources, based on information contained in the received signals; and perform discovery to make D2D communication with one or more other terminals, using a discovery resource corresponding to the wireless resource.

The base station (eNB) according to the present invention may be replaced with a terminal (UE) serving as a coordinator in an environment without base stations (eNBs).

Advantageous Effects of Invention

The present invention is capable of allowing individual UE devices to perform a device-to-device scheduling operation, with distribution, without centralized control, in a D2D network and to set a discovery resource, thereby efficiently determining discovery resources in a network where various discovery repetitions and repetitive/non-repetitive discovery operations co-exist.

In addition, the present invention is capable of efficiently determining discovery resources in the following cases: transmission/reception UE devices are not determined; only transmission UE device is determined; and transmission/reception UE devices are determined.

MODE FOR THE INVENTION

Embodiments of the present invention are described in detail referring to the accompanying drawings. Detailed descriptions of well-known functions and structures incorporated herein may be omitted to avoid obscuring the subject matter of the invention. The terms or words described in the description and the claims should not be limited by a general or lexical meaning, instead they should be analyzed as a meaning and a concept through which the inventor defines and describes the invention to the best of his/her ability, to comply with the idea of the invention.

The present invention is applied to proximate discovery of D2D communication, but is not limited thereto. The present invention can be modified within a range allowable for resource allocation for wireless communication and applied to the modifications.

The present invention can be implemented via UE and eNB. In the embodiments of the present invention, UE is capable of serving as transmission UE or reception UE for proximate discovery. A condition as to whether UE serves as transmission UE or reception UE may be determined via eNB or according to a preset rule. In the following description, the terms 'transmission UE and reception UE' are also called 'part of UE and remaining UE,' 'UE and other UE,' or 'first group UE and second group UE,' or the like.

eNB is capable of supporting or controlling the proximate discovery of UE. In various embodiments, eNB is capable of specifying a UE device to participate in a discovery resource allocation operation, from among UE devices. eNB is capable of specifying at least one of the remaining UE devices which do not serve as transmission UE. eNB is capable of specifying a UE device to participate in a discovery resource allocation operation, from among reception UE devices. In the following description, the specified UE device to participate in a discovery resource allocation operation is called reception UE (a reception UE device). However, not all reception UE devices are specified as UE devices to participate in a discovery resource allocation operation. In addition, UE devices not specified as UE devices to participate in a discovery resource allocation operation serve as reception UE devices in performing proximate discovery.

In various embodiments of the present invention, the base station (eNB) according to the present invention may be replaced with a terminal (UE) serving as a coordinator in an environment without base stations (eNBs).

Since various embodiments of the present invention determine a discovery resource and broadcast discovery signals, the present invention can be applied to various broadcast-based services, not limited to discovery services.

Figure 1:
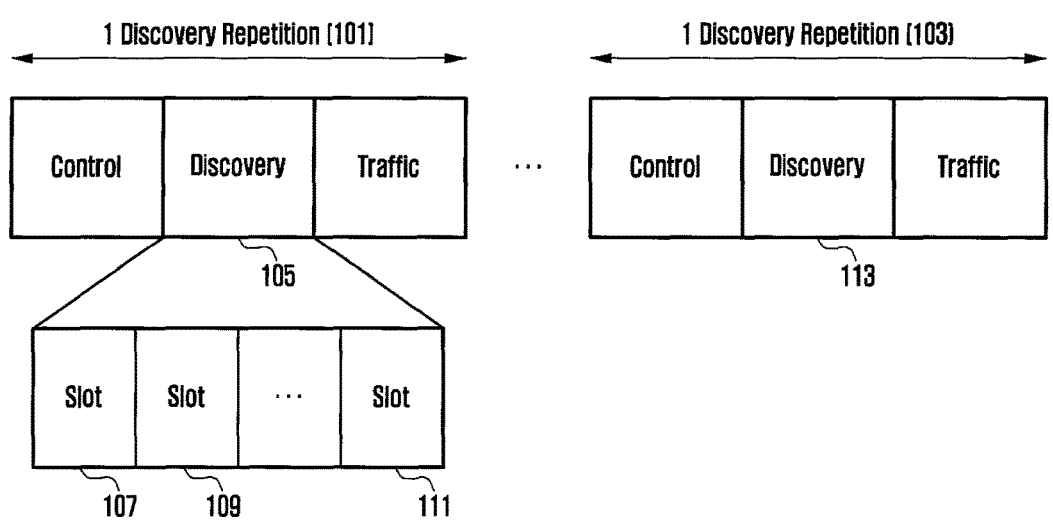
FIG. 1 is a diagram that describes a conventional proximate discovery method.
Figure 2:
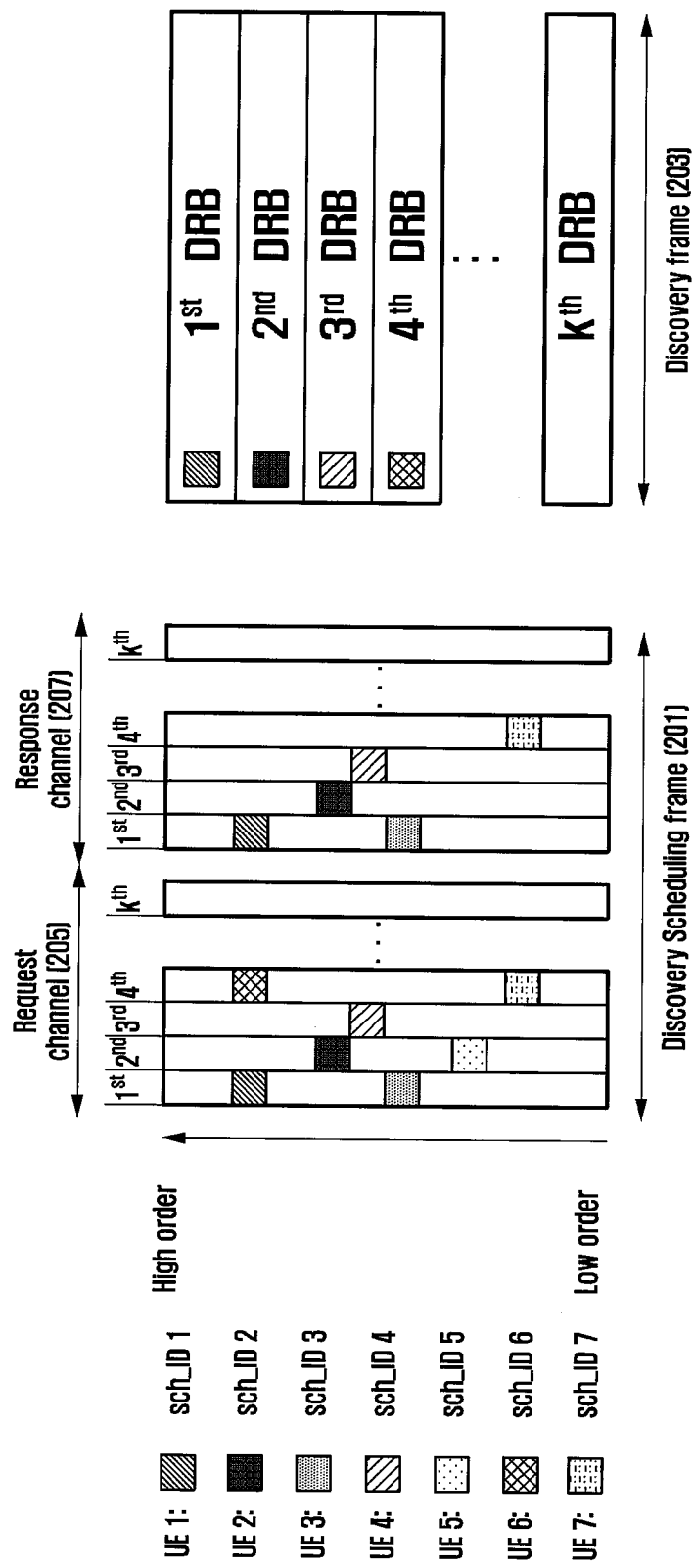
FIG. 2 is a diagram that describes a method of allocating resources for proximate discovery according to the present invention.

FIG. 2 is a diagram that describes a method of allocating resources for proximate discovery according to the present invention. Referring to FIG. 2, a wireless resource frame for proximate discovery includes a scheduling frame or discovery scheduling frame 201 (also called a scheduling interval, a scheduling area, etc.) and a discovery frame 203 (also called a discovery interval, a discovery area, etc.).

The discovery scheduling frame 201 includes a request channel 205 (also called a request interval, a request area, a transmission interval, etc.) and a response channel 207 (also called a response interval, a response area, a reception interval, etc.). The request channel 205 and the response channel 207 each include at least one control resource (also called a wireless resource, a transmission resource, a reception resource, a slot, a sub-slot, a mini-slot, etc.). In the embodiment of FIG. 2, the request channel 205 and the response channel 207 each include K control resources (K is a positive integer).

The request channel is used to transmit a request signal by one or more UE devices. The response channel is used to transmit a response signal by one or more UE devices. The request channel is used to transmit a request signal by transmission UE and to listen to the request signal by reception UE. The response channel is used to transmit a response signal by reception UE and to listen to the response signal by transmission UE. A detailed description will be provided later.

The discovery frame 203 includes one or more Discovery Resource Blocks (DRBs). The number of DRBs corresponds to the number of control resources. Each DRB corresponds to each control resource including the request channel 205 and the response channel 207. In the embodiment of FIG. 2, the discovery frame 203 includes K resource blocks (K is a positive integer). A DRB transmits a discovery message that transmission UE, which has been selected to use a corresponding DRB, uses to discover proximate UE.

In various embodiments of the present invention, UE is capable of transmitting, to eNB, a discovery resource allocation request in order to be allocated a discovery resource for proximate discovery. The eNB is capable of receiving a discovery resource allocation request from at least one UE and transmitting a response containing control information thereto.

The eNB is capable of allocating a scheduling ID to transmission UE and transmitting it to the transmission UE. In various embodiments, the scheduling ID may also be allocated through Physical Downlink Control Channel (PDCCH). The scheduling ID may correspond to C-RNTI of UE or may be determined using C-RNTI. In this case, the C-RNTI may be a C-RNTI for D2D communication which may have been pre-defined by a network operator. The eNB may perform the allocation of scheduling ID so that one transmission UE device and one or more reception UE devices transmit/receive signals to/from each other via one control resource. In another embodiment, the eNB may also perform the allocation of scheduling ID so that a number of transmission UE devices and reception UE devices transmit/receive signals to/from each other via one control resource. The term 'scheduling ID' may also be called 'discovery or communication resource ID,' 'control channel ID,' 'link ID,' 'group ID,' 'broadcast ID,' etc.

The eNB is capable of transmitting, to transmission UE, information regarding a contention index of the transmission UE during the discovery resource allocation operation. The contention index may be determined based on at least one of the following: type of UE, type of data to be transmitted/received, channel status of UE, power status of UE, and Quality of Service (QoS) class.

The eNB may also transmit, to transmission UE, the following: information regarding a frame for proximate discovery (e.g., a frame index to perform resource allocation, a frame index to transmit a request signal, a frame index to receive a response signal, etc.); information regarding UE devices to participate in proximate discovery; information regarding one or more UE devices to participate in discovery resource allocation (a reception UE device and/or reception UE specified to participate in discovery resource allocation from among the reception UE devices); a condition as to whether it participates in discovery resource allocation; information regarding a control channel and the number of DRBs; etc.

In the embodiment of FIG. 2, the eNB allocates scheduling IDs, sch_ID1 to sch_ID7, to transmission UE devices, UE 1 to UE 7, respectively, and transmits them thereto. In the embodiment of FIG. 2, UE1 is capable of determining a contention index for a scheduling operation, based on the sch_ID1 allocated by eNB, priority information, or a frame index participating in a scheduling operation.

The eNB may transmit, to reception UE, the following: information regarding a frame for proximate discovery (e.g., a frame index to perform resource allocation, a frame index to receive a request signal, a frame index to transmit a response signal, etc.); information regarding UE devices to participate in proximate discovery; information regarding one or more UE devices to participate in discovery resource allocation (a reception UE device and/or reception UE specified to participate in discovery resource allocation from among the reception UE devices); a condition as to whether it participates in discovery resource allocation; information regarding a control channel and the number of DRBs; etc. In various embodiments, part of the information described above may be broadcast via a system Information Block (SIB).

In various embodiments, the eNB is capable of transmitting scheduling IDs, allocated to transmission UE devices, to one or more reception UE devices to participate in discovery resource allocation. The eNB is capable of transmitting, to reception UE, scheduling ID of at least one transmission UE to use a specific control resource, so that the reception UE can transmit/receive signals to/from the at least one transmission UE.

The following description is provided regarding the transmission/reception via the request channel 205, in a frame for proximate discovery, shown in FIG. 2. The transmission/reception through the request channel 205 is performed in such a way that: at least one transmission UE device transmits a request signal corresponding to a contention index via a control resource; and at least one reception UE device receives the request signal. In this case, the reception UE device may be reception UE that an eNB has specified to participate in discovery resource allocation.

The transmission UE determines a contention index based on a scheduling ID allocated by the eNB, priority information, or a frame index participating in a scheduling operation. The transmission UE selects a control resource in the request channel 205, corresponding to the determined contention index, and transmits a request signal via the selected control resource. Transmission UE, located outside an area of the eNB, creates the scheduling ID or priority information based on a pre-set rule.

The transmission UE selects a DRB for proximate discovery, based on at least one of the following: information regarding the contention index received from the eNB; a scheduling ID; and information regarding a frame. The information regarding a frame refers to information related to a wireless resource to transmit a request signal, e.g., information related to a frame index, etc. The transmission UE selects a control resource in the request channel 205, corresponding to the selected DRB.

In the embodiment of FIG. 2, when UE 1, allocated a sch_ID1, performs a resource allocation operation in a first frame, it may select a first DRB based on the sch_ID1 and/or information regarding the first frame. The UE 1 may also select a first control resource corresponding to the first DRB in the request channel 205.

The control resource selection may be implemented in such a way as to: apply a scheduling ID and a discovery resource allocation operation to a function, an algorithm, etc.; select a DRB corresponding to the output therefrom; and select a control resource corresponding to the selected DRB. It should be understood that the present invention is not limited by the function, the algorithm, etc. The algorithm that transmission UE uses to select a control resource may be pre-set by an eNB and transmitted to the UE.

The transmission UE transmits a request signal via the selected control resource. The request signal may be a message, a tone signal, or a sequence having a level of energy.

In the embodiment of FIG. 2, UE 1 and UE 3 select a first resource and transmit a request signal via the selected, first control resource.

While at least one transmission UE performs transmission of a request signal, at least one reception UE listens to the request signal.

The reception UE determines whether it listens to a request channel 205 in the current scheduling interval, based on information that the eNB directly notifies and/or information regarding a discovery frame received from the eNB. When the reception UE determines to listens to a request channel 205, it receives all of the request signals of the request channel.

The reception UE may ignore request signals which have an energy level less than a preset threshold.

The following description is provided regarding the transmission/reception via the response channel 207, in a frame for proximate discovery, shown in FIG. 2. The transmission/reception through the response channel 207 is performed in such a way that: at least one reception UE device transmits a response signal containing information regarding received request signals; and at least one transmission UE device receives the response signal. In this case, the reception UE device may be reception UE that an eNB has specified to participate in discovery resource allocation.

The reception UE transmits a response signal via the selected control resource, i.e., a control resource which receives request signals from one or more transmission UE devices. The response signal may contain information regarding the received request signal. More specifically, the response signal may contain at least one of the following: a scheduling ID of transmission UE corresponding to at least one request signal; a level of received signal power; priority of transmission UE; and a contention index of transmission UE.

In an embodiment of the present invention, the reception UE compares contention indexes of request signals received from one or more transmission UE devices with each other, and transmits a response signal to only transmission UE of the highest contention index. A detailed description will be provided later referring to FIG. 10.

While reception UE performs transmission of a response signal, one or more transmission UE devices listen to the response signal. The transmission UE may listen to a response signal via a response channel resource corresponding to a control resource through which it has already used for transmission of a request signal.

In various embodiments, when the transmission UE selects the highest contention index from among allocable contention indexes, it may not listen to the response signal.

In the embodiment of FIG. 2, when UE 6 selects the highest contention index, 50, it may not listen to a response signal in the response channel 207.

The transmission UE selects a DRB to be used for proximate discovery based on the received response signal. The transmission UE is capable of identifying contention indexes of other transmission UE devices using a control resource selected by the transmission UE, based on the received response signal. When the transmission UE ascertains that there is transmission UE with a contention index higher than that of the transmission UE, it does not select a DRB corresponding to its selected control resource. When the transmission UE ascertains that there is not transmission UE with a contention index higher than that of the transmission UE, it sets a DRB corresponding to its selected control resource to be used for proximate discovery.

In an embodiment of the present invention, when the reception UE transmits a response signal to only transmission UE with the highest contention index, the transmission UE that received the response signal selects a DRB for proximate discovery according to the response signal. On the other hand, transmission UE that has not received a response signal may not select a DRB. A detailed description will be provided later referring to FIG. 10. In various embodiments, reception UE that eNB does not specify to participate in discovery resource allocation operation may not perform the operations described above in the discovery scheduling frame 201. In this case, the reception UE may perform operations for proximate discovery in the discovery frame 203.

In an embodiment of the present invention, a system may be implemented to operate in two types of discovery mode: one of which is a mode of only making a request and the other of which is a mode of making both a request and a response. In a mode of only making a request, transmission UE transmits a request signal, and immediately a discovery resource indicated by the request signal transmits discovery data, without performing the response process. In a mode of making both a request and a response, as described above, only when the response signal indicates transmission UE, the transmission UE performs transmission of discovery data. When transmission UE is operable in the two types of discovery mode, it may include a condition in a request signal, indicating whether it performs uni-directional or bi-directional control in order to distinguish between the two modes. When indication is made to perform uni-directional control, reception UE receives discovery data from a discovery resource that the transmission UE has indicated arbitrarily or according to a pre-set rule, without performing a response process. When indication is made to perform bi-directional control, reception UE performs a response procedure as the embodiments of the present invention and receives discovery data from a discovery resource indicated by transmission UE of the highest priority.

The following description provides is provided regarding the transmission/reception via the discovery frame 203 in a frame for proximate discovery, shown in FIG. 2.

The transmission UE selects a DRB to be used for the last proximate discovery via the discovery scheduling frame 201 and transmits a discovery message using the selected DRB. When transmission UE does not select a DRB via the discovery scheduling frame 201, it repeats the process described above in the next discovery frame to select a DRB to be used for proximate discovery and then performs proximate discovery. Therefore, transmission UE with a high contention index is capable of transmitting a discovery message for proximate discovery, with respect to the selected DRB, without conflicting with nearby transmission UE.

In the embodiment of FIG. 2, UE 1, UE 2, UE 4, and UE 6, which have a high contention index in individual control resources, are capable of transmitting discovery messages, using first, second, third and fourth DRBs, respectively.

The reception UE listens to a discovery message transmitted via a DRB corresponding to the selected control resource. In another embodiment, reception UE may receive discovery messages transmitted via all the DRBs. For example, UE, which is not specified to participate in discovery resource allocation operation, may receive discovery messages related to all the DRBs from an eNB.

After that, transmission UE and reception UE are capable of performing operations for proximate discovery, in addition to transmitting and listening to discovery messages.

Figure 3:
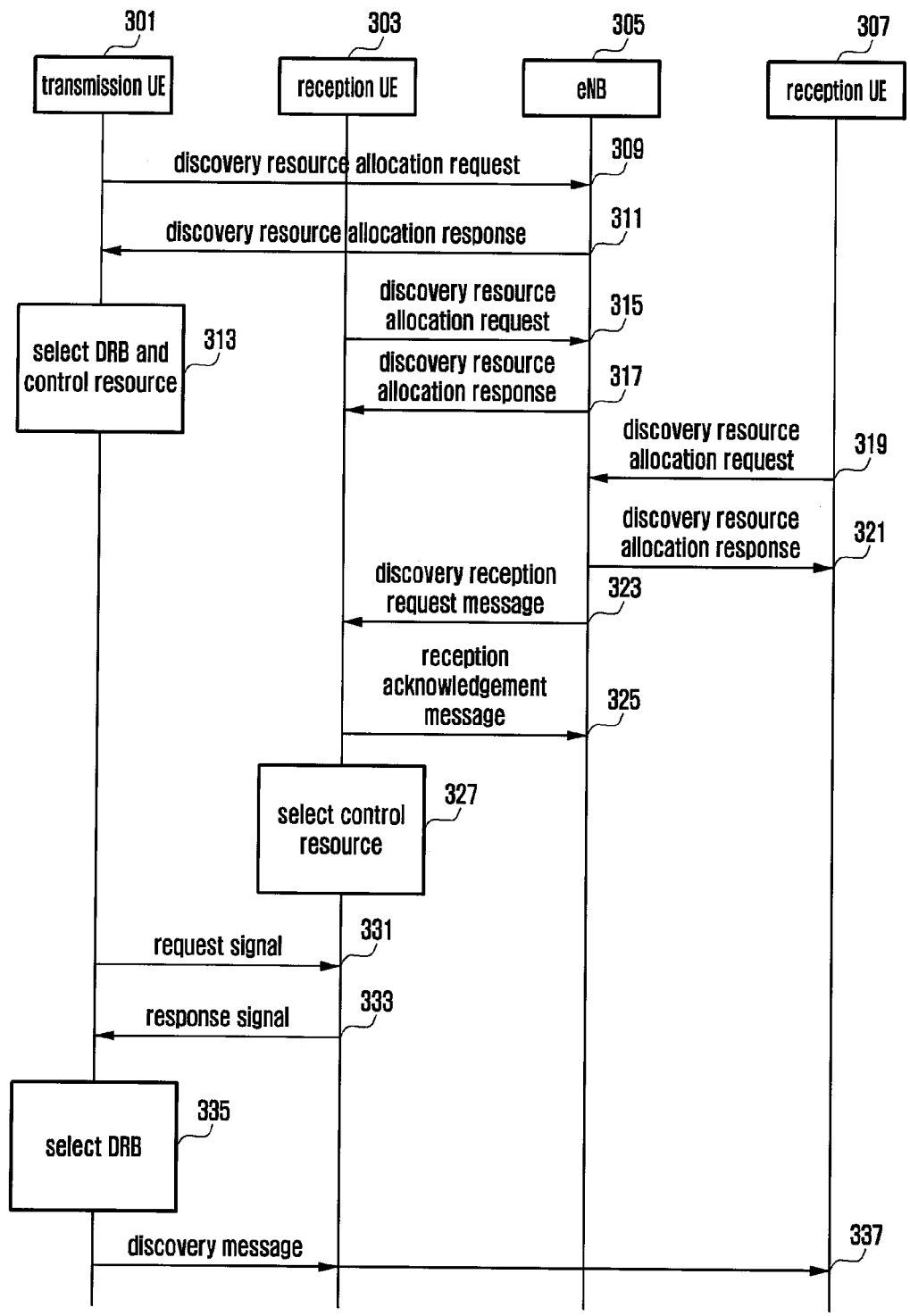
FIG. 3 is a flowchart that describes a method of allocating resources for proximate discovery according to the present invention.

FIG. 3 is a flowchart that describes a method of allocating resources for proximate discovery according to the present invention.

Referring to FIG. 3, transmission UE 301 transmits a discovery resource allocation request to an eNB 305 in operation 309. The discovery resource allocation request may correspond to a scheduling request, a D2D communication request, a proximate discovery request, etc.

The eNB 305 transmits a discovery resource allocation response to the transmission UE 301 in operation 311. The discovery resource allocation response may contain a scheduling ID of the transmission UE 301. In another embodiment, the scheduling ID may be allocated via Physical Downlink Control Channel (PDCCH). The discovery resource allocation response may contain information regarding a contention index of the transmission UE 301 to perform a discovery resource allocation operation. The contention index may be determined, based on: a type of UE, a type of data to be transmitted/received, a channel status of UE, a power status of UE, etc. The discovery resource allocation response may contain: information related to a discovery resource frame for proximate discovery (e.g., a frame index, etc.); information regarding UE devices participating in proximate discovery; information regarding at least one UE device to participate in discovery resource allocation (a reception UE device and/or reception UE specified to participate in discovery resource allocation from among the reception UE devices); a condition as to whether it participates in discovery resource allocation; information regarding a control channel and the number of DRBs; etc.

The transmission UE 301 selects a DRB and a control resource, based on at least one of the following: information regarding a contention index received from the eNB, a received scheduling ID and information regarding a frame in operation 313.

The transmission UE 301 selects a DRB to be used for proximate discovery, based on at least one of the following: information regarding a contention index received from the eNB, a scheduling ID and information regarding a frame to transmit a request signal. The transmission UE 301 also selects a control resource in a request channel corresponding to the selected DRB.

The reception UE devices 303 and 307 transmit discovery resource allocation requests to the eNB 305 in operations 315 and 319, respectively.

The eNB 305 transmits discovery resource allocation responses to the reception UE devices 303 and 307 in operations 317 and 321, respectively. The discovery resource allocation response may contain: information related to a discovery resource frame for proximate discovery (e.g., a frame index, etc.); information regarding UE devices participating in proximate discovery; information regarding at least one UE device to participate in discovery resource allocation (a reception UE device and/or reception UE specified to participate in discovery resource allocation from among the reception UE devices); a condition as to whether it participates in discovery resource allocation; information regarding a control channel and the number of DRBs; etc. In various embodiments, part of the information described above may be broadcast via a system Information Block (SIB).

The eNB 305 is capable of specifying the reception UE 303 or 307 as UE to participate in discovery resource allocation operation. In this case, the eNB 305 is capable of transmitting a discovery reception request message to the specified reception UE 303 in operation 323. The discovery reception request message may correspond to a scheduling request message, a discovery resource allocation participating request, etc. The discovery reception request message may contain a scheduling ID for at least one transmission UE 301 to use a specified control resource, so that the specified reception UE 303 can transmit/receive signals to/from the transmission UE 301.

The specified reception UE 303 transmits a reception acknowledgement message to the eNB 305 in operation 325. The reception acknowledgement message may correspond to a scheduling response, a discovery resource allocation participating response, etc.

The specified reception UE 303 selects a control resource based on information regarding a received frame of the transmission UE 301 in operation 327. The information regarding a frame refers to information related to a wireless resource to receive request signals, and may be a frame index, the number of performed discovery resource allocation operations, etc. When a reception UE device has not been specified, the embodiment is implemented in such a way that reception UE devices receive all the resources, without performing operations 323, 325, and 327.

The transmission UE 301 transmits a request signal via the control resource selected in a request channel interval in operation 331. The request signal may be a message, a tone signal, or a sequence having a level of energy.

The specified reception UE 303 is capable of listening to the request signal transmitted via the selected control resource. In this case, the specified reception UE 303 may ignore request signals that have an energy level less than a present threshold.

The specified reception UE 303 transmits a response signal via a control resource selected in a response channel interval in operation 333. The response signal may contain information regarding the received request signal. More specifically, the response signal may contain a scheduling ID of transmission UE 301 corresponding to at least one request signal and/or a contention index of transmission UE.

In an embodiment of the present invention, the specified reception UE 303: compares contention indexes included in the request signals with each other; determines a request signal with the highest contention index; and transmits a response signal to the transmission UE 301 which transmitted the determined request signal, via a wireless resource which received the determined request signal. The transmission UE 301 listens to the response signal. The transmission UE 301 is capable of listening to a response signal being transmitted via a control resource that it has already transmitted a request signal.

When receiving the response signal, the transmission UE 301 selects a DRB, based on information regarding a contention index included in the response signal or information regarding a contention index determined by a location of the response signal in operation 335. The transmission UE 301 is capable of determining contention indexes of other transmission UE devices which have used its selected control resource, based on the received response signal. When the transmission UE 301 ascertains that transmission UE exists which has a higher contention index than the transmission UE 301 does, it does not select a DRB corresponding to the selected control resource. When the transmission UE 301 ascertains that transmission UE does not exist which has a higher contention index than the transmission UE 301 does, it sets a DRB corresponding to the selected control resource to be used for proximate discovery.

In an embodiment of the present invention, when the reception UE devices 303 and 307 transmit a response signal to only transmission UE with the highest contention index, the transmission UE 301 may select a DRB depending on whether it receives a response signal. When the transmission UE 301 receives a response signal, it selects a DRB corresponding to a contention index. On the other hand, when the transmission UE 301 does not receive a response signal, it does not select a DRB corresponding to a contention index.

When the transmission UE 301 selects a DRB according to a contention index, it transmits a discovery message to the reception UE devices 303 and 307 in a discovery frame interval in operation 337. The transmission UE 301 transmits a discovery message to the reception UE 303 which has been specified and the reception UE 307 which has not been specified. The discovery message may be broadcast via a broadcast channel.

When the transmission UE 301 has not selected a DRB, it repeats the operations described above in the next discovery frame to select a DRB to be used for proximate discovery, and performs proximate discovery.

Figure 4:
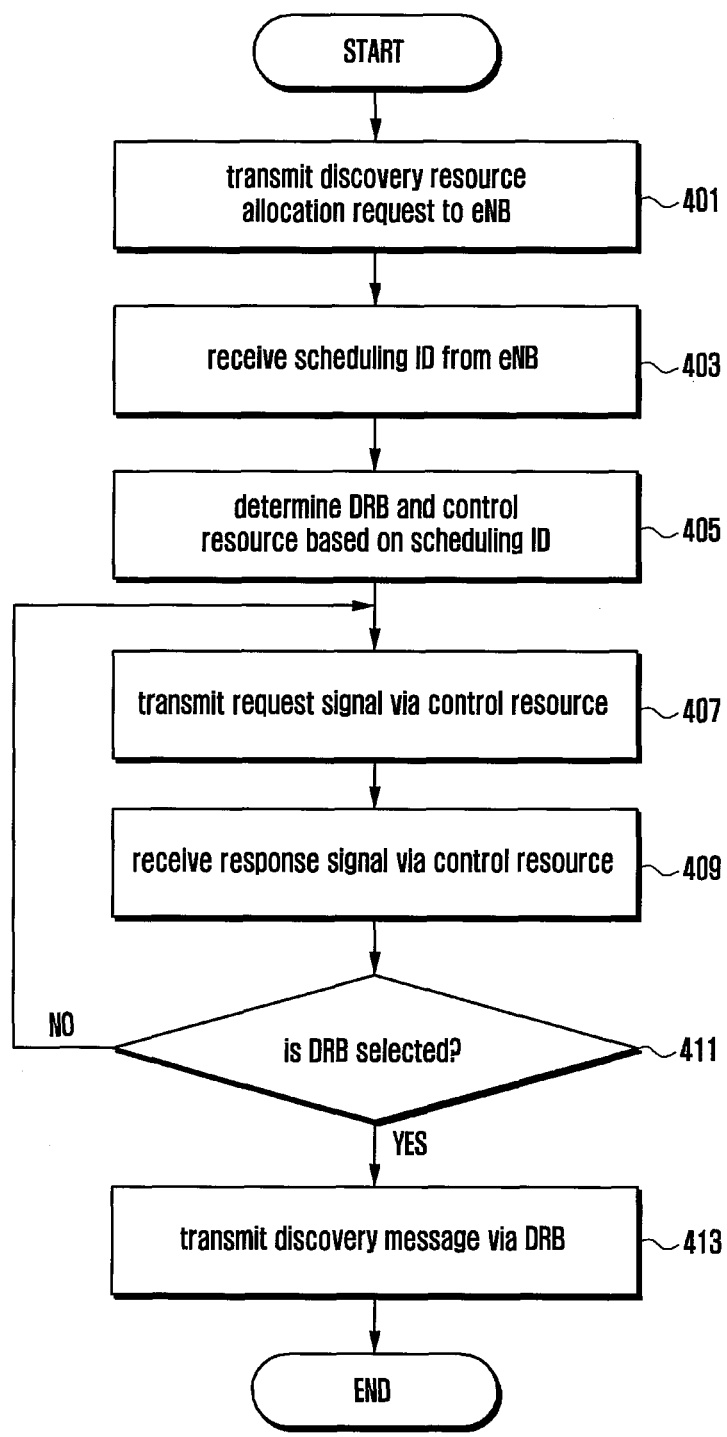
FIG. 4 is a flowchart that describes operations of UE serving as transmission UE according to the present invention.

FIG. 4 is a flowchart that describes operations of UE serving as transmission UE according to the present invention.

Referring to FIG. 4, UE transmits a discovery resource allocation request to eNB in operation 401. The UE receives a scheduling ID in response to the discovery resource allocation request from the eNB in operation 403. The UE may also receive information regarding a discovery frame from the eNB.

The UE is capable of determining a DRB to be used for proximate discovery and a control resource corresponding to the DRB based on the scheduling ID in operation 405. After that, the UE transmits a request signal via the selected control resource in a request channel interval in operation 407. The UE receives a response signal via the selected control resource in a response channel interval in operation 409. When the resources in the request channel interval and the response channel interval are to be simultaneously used, the UE transmitting a request signal may not perform reception of a response signal as in operation 409.

When receiving the response signal, the UE determines whether it can select the last DRB in operation 411. The UE compares its contention index with contention indexes of other UE devices contained in the response signal. When the UE ascertains that it has the highest contention index, it selects a DRB corresponding to a control resource.

When the UE ascertains that it can select the last DRB in operation 411, it transmits a discovery message via the selected DRB in the discovery frame interval in operation 413. On the other hand, when the UE ascertains that it cannot select the last DRB in operation 411, it returns to operation 407, transmitting a request signal, and repeats the operations described above in the next scheduling frame.

Figure 5:
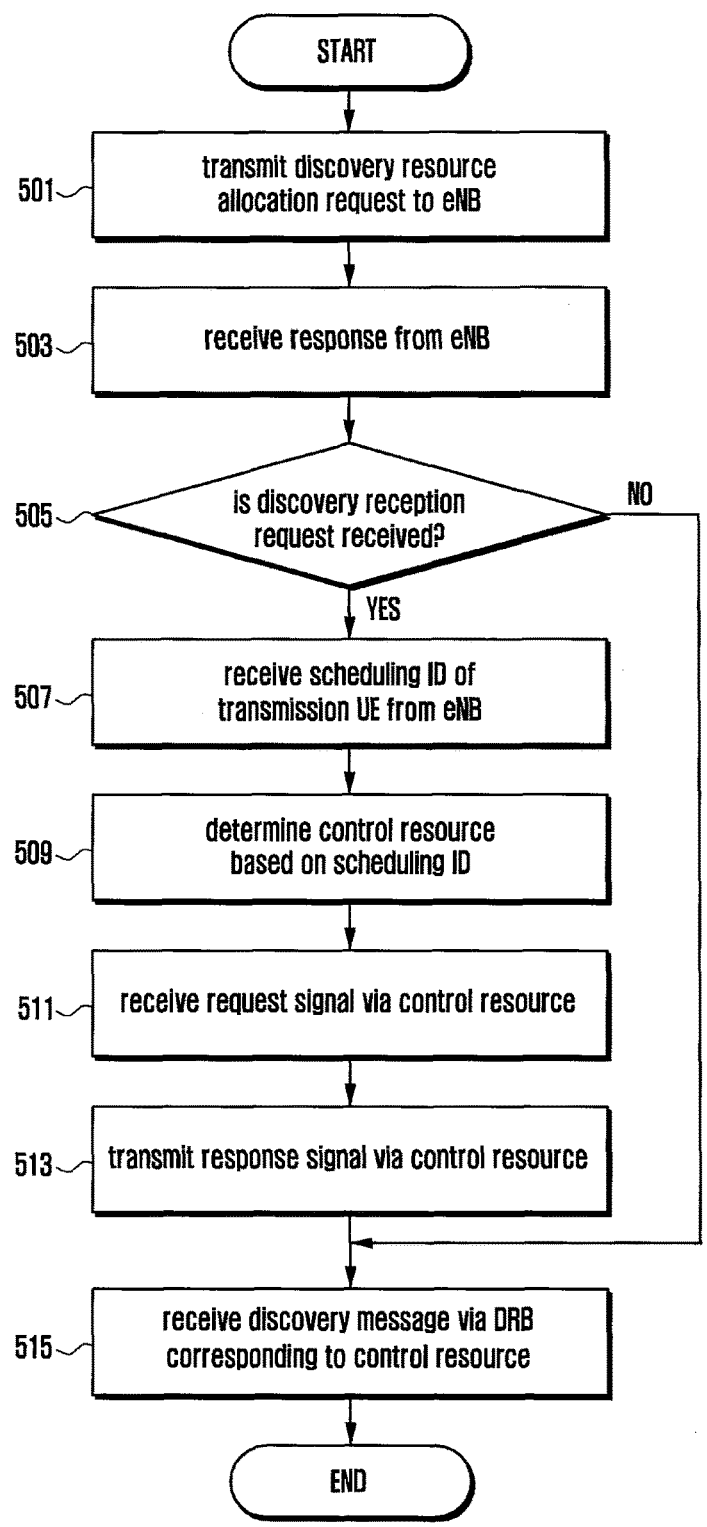
FIG. 5 is a flowchart that describes operations of UE serving as reception UE according to the present invention.

FIG. 5 is a flowchart that describes operations of UE serving as reception UE according to the present invention.

Referring to FIG. 5, UE transmits a discovery resource allocation request to eNB in operation 501. The UE receives a response to the discovery resource allocation request from the eNB in operation 503. The response from the eNB may contain information regarding a discovery frame.

The UE determines whether a discovery reception request is received from the eNB in operation 505. That is, the UE determines whether it is specified by the eNB to participate in a discovery resource allocation process.

When the UE ascertains that a discovery reception request is received from the eNB in operation 505, it receives a scheduling ID of at least one transmission UE from the eNB in operation 507. The UE selects a control resource based on the received scheduling ID and information regarding a frame to receive a request signal in operation 509. In an embodiment, when the UE needs to participate in a discovery reception request, it may transmit the reception acknowledgement message to the eNB. In another embodiment, UE (reception UE) may receive control resources of all the scheduling frames, without specifying transmission UE. In this case, the UE does not obtain a scheduling ID of a specified transmission UE from the eNB.

After that, the UE receives a request signal transmitted via the selected control resource in the request channel interval in operation 511. The UE is capable of determining a contention index of UE devices that have transmitted the request signal. The UE creates a response message for UE which has the highest contention index from among the UE devices that transmitted a request signal via the selected control resource in the response channel interval, and then transmits the response signal in operation 513.

After that, the UE receives a discovery message via a DRB corresponding to the selected control resource in the discovery frame interval in operation 515.

When the UE has not received a discovery reception request, it receives a discovery message via a DRB, without participating in the discovery resource allocation process, in operation 515. In this case, the UE may receive discovery messages transmitted via all the DRBs.

Figure 6:
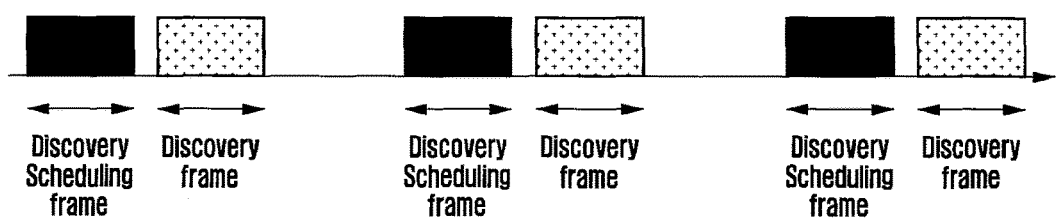
FIG. 6 is a diagram that describes an example of dynamic discovery resource allocation according to the present invention.

FIG. 6 is a diagram that describes an example of dynamic discovery resource allocation according to the present invention.

The discovery resource allocation method according to the present invention may be applied to dynamic discovery resource allocation. Referring to FIG. 6, eNB and UE devices repeat the discovery resource allocation in the discovery scheduling frame interval and discovery frame interval, thereby dynamically allocating discovery resources.

Figure 7:
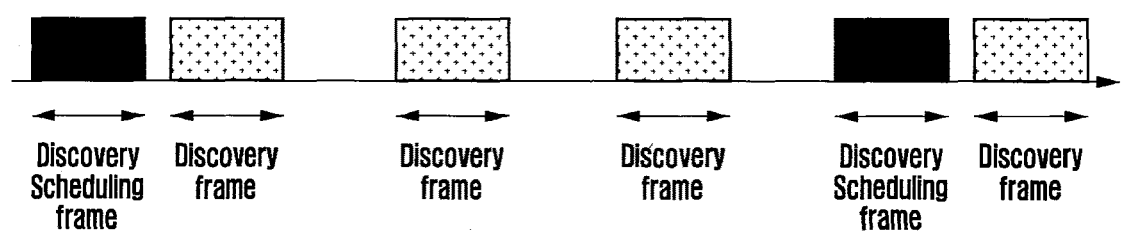
FIG. 7 is a diagram that describes an example of semi-persistent discovery resource allocation according to the present invention.

FIG. 7 is a diagram that describes an example of semi-persistent discovery resource allocation according to the present invention.

The discovery resource allocation method according to the present invention may be applied to semi-persistent discovery resource allocation. Referring to FIG. 7, eNB and UE devices repeatedly perform proximate discovery through the discovery frame interval, using a discovery resource allocated through a discovery scheduling frame interval. Repeatedly allocated discovery resources may be a frequency or time hopping resource. This is because, although a logical resource is fixed for a certain period of time, the connection to a location of a real resource is varied, thereby reducing interference.

Figure 8:
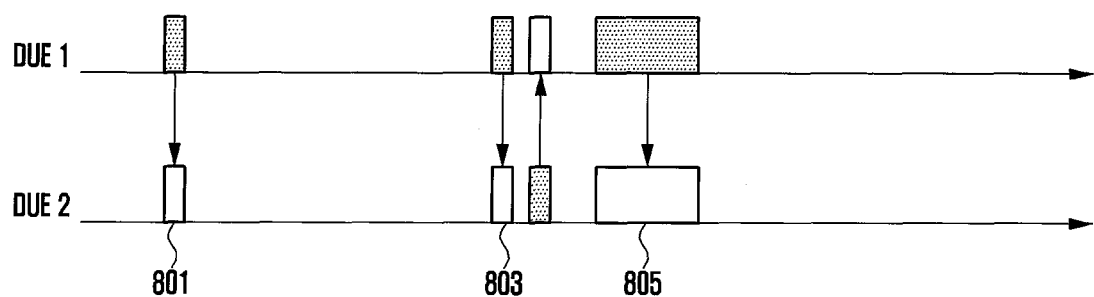
FIG. 8 is a diagram that describes a discovery operation of two steps according to the present invention.

FIG. 8 is a diagram that describes a discovery operation of two steps according to the present invention. The present invention may also be applied to a discovery operation of two steps. Referring to FIG. 8, DUE 2 serving as reception UE: obtains a scheduling ID, Scheduling_ID, in a first discovery frame 801 that occurs periodically first; detects an intent of DUE 1 to transmit a discovery signal and a location of a discovery resource in a discovery scheduling frame 803 that occurs secondly; and receives a message via in a discovery resource in a second discovery frame 805.

Figure 9:
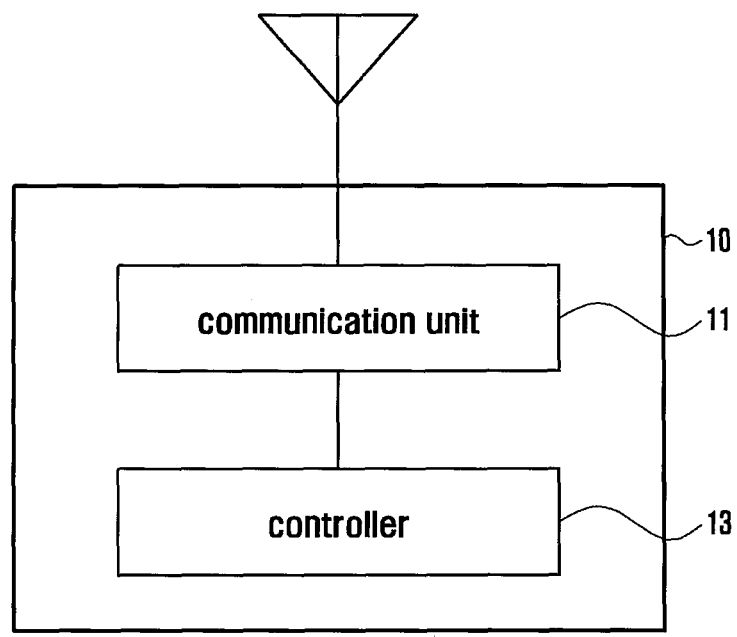
FIG. 9 is a block diagram showing UE according to the present invention.

FIG. 9 is a block diagram showing UE according to the present invention.

Referring to FIG. 9, UE 10 includes a communication unit 11 and a controller 13.

The communication unit 11 performs data communication with an eNB or other UE.

The controller 13 controls components of the UE 10 to perform operations according to the present invention. The controller 13 performs control operations described above in the previous embodiments.

Figure 10:
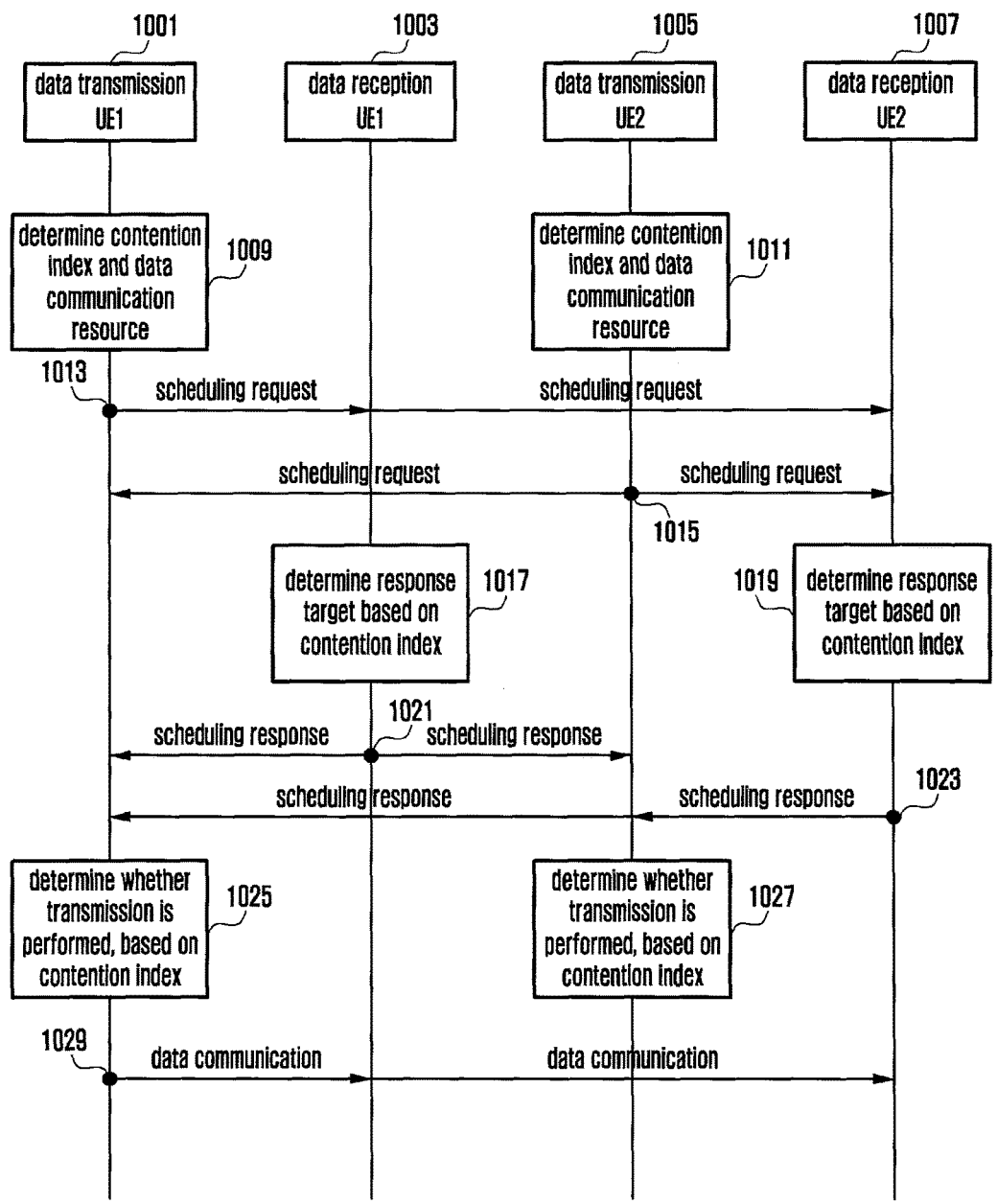
FIG. 10 is a detailed flowchart for performing transmission of a request signal 309 and a response signal 311 shown in FIG. 3 according to the present invention.

FIG. 10 is a detailed flowchart for performing transmission of a request signal 331 and a response signal 333 shown in FIG. 3 according to the present invention.

Referring to FIG. 10, when data transmission UE1 1001 and data transmission UE2 1005 are located with the same region data reception UE1 1003 and data reception UE2 1007 are located with the same region, the contention and dissolution for data communication resources is performed below.

The data transmission UE1 1001 and data transmission UE2 1005 determine contention indexes and data communication resources respectively in operations 1009 and 1011. The contention index may be determined, based on a scheduling ID allocated by an eNB and information regarding a frame. When the data transmission UE1 1001 and the data transmission UE2 1005 are running in a network area where an eNB is not discovered, they can determine their contention indexes in themselves. Data communication resources may be allocated by an eNB. When data transmission UE1 1001 and data transmission UE2 1005 are running in a network area where an eNB is not discovered, data communication resources may also be determined by UE.

The data transmission UE 1 1001 transmits, to adjacent UE devices, a scheduling request message in a scheduling request frame, in order to inform them of the determined data communication resource and a contention index corresponding to the resource in operation 1013. Similarly, the data transmission UE 2 1005 also transmits, to adjacent UE devices, a scheduling request message in a scheduling request frame, in order to inform them of the determined data communication resource and a contention index corresponding to the resource in operation 1015. Operations 1013 and 1015 are performed in the same scheduling request frame. The scheduling request message may contain a contention index value and a location of the data communication resource. The contention index or the location of the data communication resource may be preset according to a location of a resource transmitting a scheduling request message.

In a state where the data reception UE1 1003 and the data reception UE2 1007 have received the scheduling request messages 1013 and 1015 from the data transmission UE 1 1001 and the data transmission UE2 1005, respectively, when contention occurs in the same data communication resource, the UE1 and UE2 compare the contention index values of the individual data transmission UE1 and UE2 with each other, and determine data transmission UE won in the contention as a response target in operations 1017 and 1019. For example, when data transmission UE has a larger contention index value than other data transmission UE devices, it won in the contention. The embodiment of FIG. 10 is implemented, assuming that, since the data transmission UE 1 1001 proposes a contention index, 10, and the data transmission UE 2 1005 proposes a contention index, 5, the data transmission UE 1 1001 won in the contention.

The data reception UE1 1003 and the data reception UE2 1007 transmit scheduling response messages in operations 1021 and 1023, respectively. To this end, based on a scheduling request message that the UE1 1003 and the UE2 1007 received from transmission UE determined as a response target, e.g., data transmission UE1 1001, the UE1 1003 and the UE2 1007 create the same message as the received scheduling request message and transmit the scheduling response message in the scheduling response frame.

A resource to transmit a scheduling response message in the scheduling response frame may be determined by an eNB or based on a scheduling request message from data transmission UE determined as a response target. For example, the data reception UE1 1003 and data reception UE2 1007 may determine a resource index of a scheduling response message to be identical to that of a scheduling request message received from the data transmission UE determined as a response target. In another embodiment, the data reception UE1 1003 and data reception UE2 1007 may determine a resource index of a scheduling response message according to a contention index obtained from a scheduling request message received from data transmission UE determined as a response target. In still another embodiment, the data reception UE1 1003 and data reception UE2 1007 may determine a resource index of a scheduling response message according to a data resource allocation index obtained from a scheduling request message received from data transmission UE determined as a response target.

Therefore, a number of data reception UE devices are capable of transmitting the scheduling response messages via the same resource which is determined the resource determining method described above. In this case, data of the scheduling response messages need to contain the same content. The data transmission UE is capable of receiving a number of scheduling response messages transmitted in layers via the same resource, without interference. This is because the scheduling response messages are identical to each other.

The data transmission UE1 1001 receives the scheduling response messages from the data reception UE1 1003 and data reception UE2 1007.

In an embodiment of the present invention, when the data transmission UE 1 1001 receives the same message that the data reception UE 1 1003 and the data reception UE2 1007 transmitted via the same resource, it recognizes that it won over the contention against the adjacent transmission UE.

In another embodiment of the present invention, when data reception UE1 1003 and data reception UE2 1007 are located in different places, they may determine data transmission UE devices as a winner won over the contention, which differ from each other. For example, the data reception UE1 1003 may determine the data transmission UE1 1001 as UE won over the convention and set it as a response target. Similarly, the data reception UE2 1007 may determine the data transmission UE2 1005 as UE won over the convention and set it as a response target. Since the data reception UE1 1003 and data reception UE2 1007 determine resources for scheduling response messages, based on scheduling request messages from data transmission UE devices determined as response targets, respectively, they receive the scheduling response messages via the resources that differ from each other. When the data transmission UE1 1001 and data transmission UE2 1005 recognize that contention has occurred in the same resource, they also determine a condition as to whether transmission is performed, based on the contention index. When data transmission UE1 1001 and data transmission UE2 1005 receive scheduling response messages which have a contention index greater than or equal to their contention indexes, they abandon the transmission of data. On the other hand, when data transmission UE1 1001 and data transmission UE2 1005 ascertain that the received scheduling response messages have a contention index less than their contention indexes, they determined to transmit data.

In the embodiment of FIG. 10, since the data transmission UE 1 1001 has a contention index, 10, and the data transmission UE 2 1005 has a contention index, 5, the data transmission UE 1 1001 performs the transmission of data in operation 1029.

Figure 11:
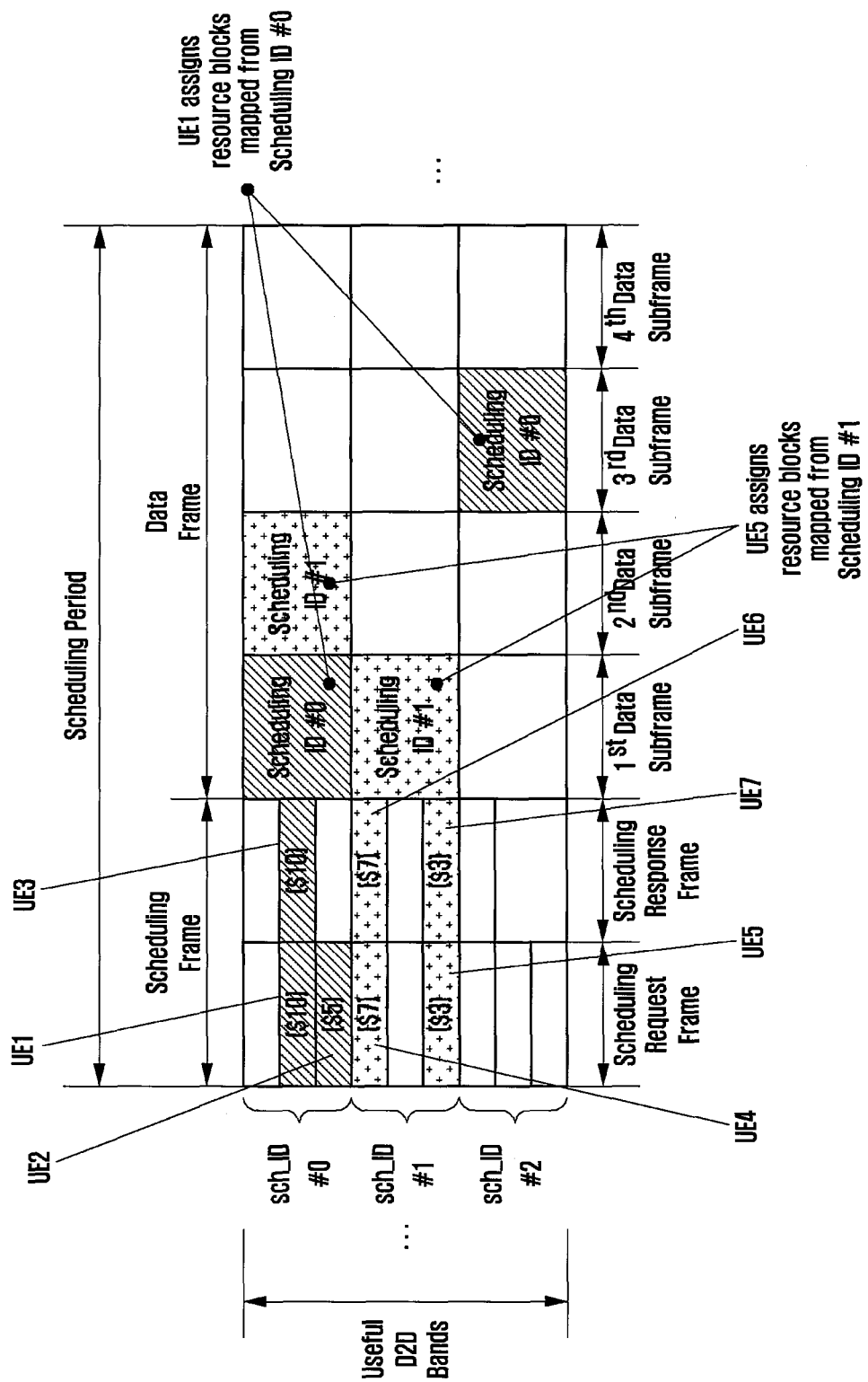
FIGS. 11 and 12 show resource structures applied to a D2D scheduling operation according to the present invention.
Figure 12:
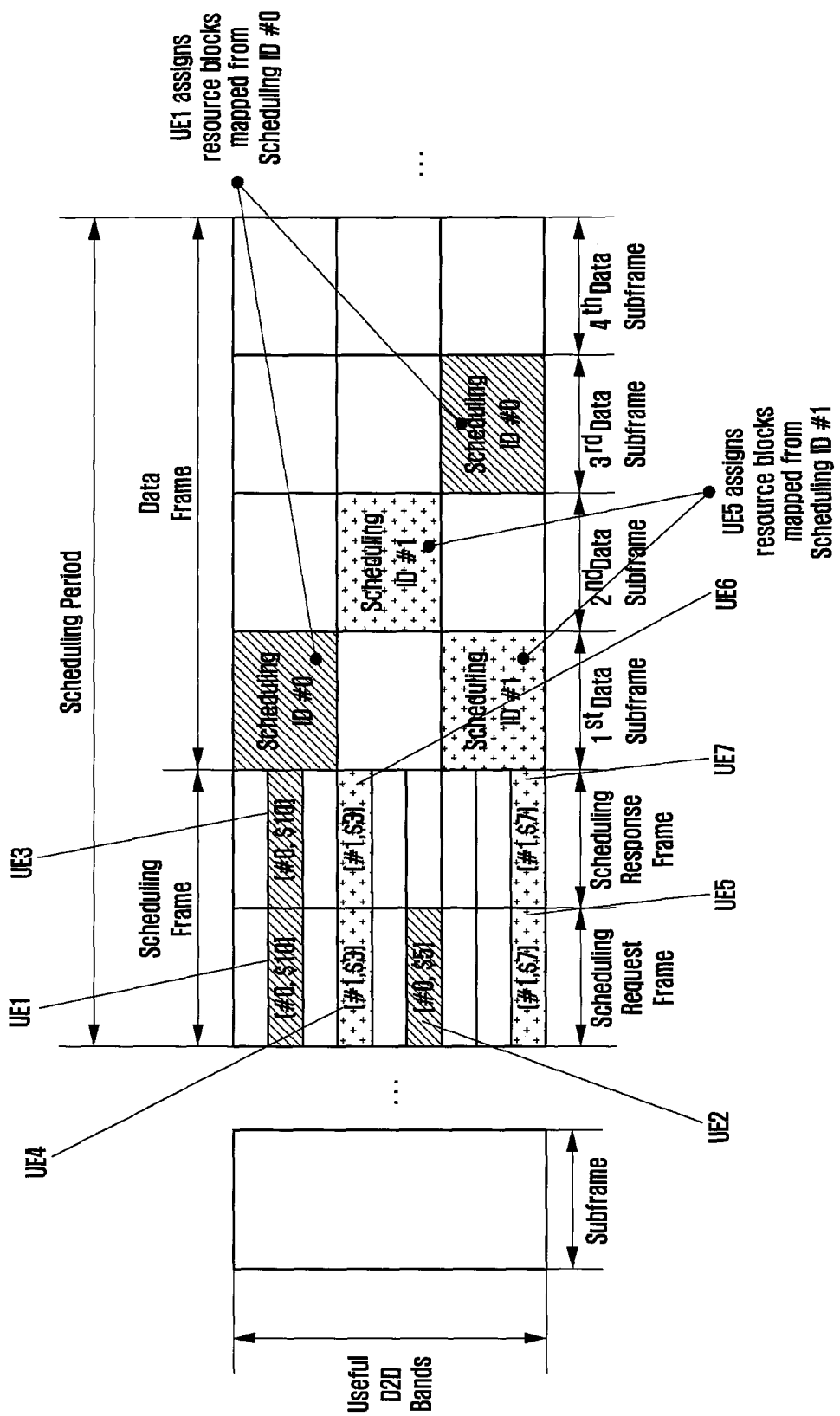

FIGS. 11 and 12 show resource structures applied to a D2D scheduling operation according to embodiments of the present invention. FIGS. 11 and 12 illustrate diagrams resource structures where a D2D scheduling operation is developed. The embodiments of FIGS. 11 and 12 are described based on an LTE system, assuming that a terminal is called user equipment (UE) and a message transmitting resource operates based on a unit of subframe. However, it should be understood that the present invention may applied to all types of 3GPP wireless communication systems as well as LTE systems.

Referring to FIG. 11, UE1, UE2, and UE4, serving as a data transmission UE device, transmit/receive scheduling transmission messages and/or scheduling reception messages in resource areas of a scheduling frame, determined according to scheduling IDs that UE1, UE2, and UE4 determined for themselves or received from an eNB. The resource location for transmission/reception of data is determined according to a scheduling ID.

In the embodiment of FIG. 11, UE1 and UE2, serving a data transmission UE device, determine the scheduling ID, Sch_ID, as '0.' UE1 and UE2 select one control resource index from the resource areas whose scheduling IDs are '0' from among the resources of scheduling request frames, and transmit a scheduling request message. The scheduling request message may contain a contention index value which is determined by an eNB or arbitrarily generated by each of the UE devices. In the embodiment, UE1 and UE2 determine the contention index values as $10 and $5, include the determined contention index values in scheduling request messages, and transmit the messages, respectively.

UE3 refers to a UE device which does not have data to be transmitted in the current scheduling interval, and only receives data. UE3 receives part or all of the control resources of the scheduling request frame, thereby learning the contention index values of the UE1 and UE2. In the embodiment of FIG. 11, since the contention index of UE1, $10, is greater than that of UE2, UE3 selects a control resource index, associated with (identical to, in the embodiment) a control resource index transmitted by UE1 in the following scheduling response frame, and transmits a scheduling response message.

There may be a case that a number of data reception UE devices transmit signals via the same resource. Therefore, scheduling response messages to one data transmission message need to have the same content. In the embodiment, since UE1 has a higher contention index value than UE2, UE3 ascertains that UE1 won over the content against UE2. Therefore, UE3 transmits scheduling response message containing the contention index value of UE1, $10, to the adjacent data transmission UE devices.

UE1 looks at the scheduling response message and determines to transmit data. UE2 looks at the scheduling response message and determines to abandon the transmission of data. UE1 performs the transmission of data at a resource block determined based on scheduling ID #0.

In the embodiment of FIG. 11, UE6 and UE7 receive the scheduling request messages from the UE4 and UE5, and transmit corresponding scheduling response messages thereto, respectively. In an embodiment, UE6 identifies signals transmitted from only UE4, but does not signals from UE5. In contrast, UE7 identifies signals transmitted from only UE5, but does not signals from UE4. In this case, UE6 and UE7 transmit scheduling response messages at the control resource indexes received from UE3 and UE4, respectively. When UE4 and UE5 receive the scheduling response messages from UE6 and UE7, they compare contention indexes with each other and determine whether they perform transmission of data. When each of the UE4 and UE5 receives only a scheduling response message in response to its request, it determines to perform transmission of data without contention.

The embodiment of FIG. 12 is implemented, assuming that it has the same conditions as FIG. 11. The embodiment of FIG. 12 is identical to that of FIG. 11, except for the following processes. In embodiment of FIG. 12, resource areas for scheduling request and response messages are not distinguished according to scheduling IDs; the scheduling request or response frame resources are shared; the scheduling IDs are not distinguished by locations of resources; and UE devices include scheduling IDs in scheduling request or response messages and transmit them.

Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims. It is to be understood that embodiments are explanatory only and are not restrictive of the invention.

The terms and words used in the description are not limited to the bibliographical meanings, but, are merely used by the inventor to enable a clear and consistent understanding of the present disclosure. Accordingly, it should be apparent to those skilled in the art that the description of various embodiments of the present disclosure is provided for illustration purpose only and not for the purpose of limiting the present disclosure as defined by the appended claims and their equivalents.

The invention claimed is:

1. A method of allocating discovery resources of a terminal configured to perform device-to-device (D2D) communication comprising:
   transmitting a request signal including a contention index of the terminal on a wireless resource;
   if a response signal is received on the wireless resource in response to the request signal, selecting a discovery resource corresponding to the contention index of the terminal based on the response signal; and
   performing discovery for the D2D communication using the selected discovery resource.

2. The method of claim 1, wherein the contention index is determined:
   based on at least one of information regarding the contention index received from a base station (eNB), a scheduling identifier of the terminal, or information regarding a frame to transmit signals; or
   by the terminal.

3. The method of claim 1, wherein selecting the discovery resource comprises:
   if the response signal is not received on the wireless resource in response to the request signal, abandoning the selection of the discovery resource.

4. The method of claim 1, wherein selecting the discovery resource comprises:
   comparing the contention index of the terminal with contention indexes of one or more other terminals, contained in the response signal; and
   if the contention index of the terminal is higher than the contention indexes of the one or more other terminals, selecting the discovery resource corresponding to the wireless resource.

5. The method of claim 1, wherein:
   the request signal is transmitted in a first interval of a frame for the discovery;
   the response signal is received in a second interval of the frame for the discovery; and
   the discovery for the D2D communication is performed in a third interval of the frame for the discovery.

6. A method of allocating discovery resources of a terminal configured to perform device-to-device (D2D) communication comprising:
   receiving a request signal including a contention index of an other terminal on a wireless resource;
   transmitting a response signal on the wireless resource based on information contained in the request signal; and
   performing discovery for the D2D communication with the other terminal using a discovery resource corresponding to the contention index of the other terminal.

7. The method of claim 6, wherein the contention indexes is determined:
   based on at least one of information regarding the each of the contention indexes received from a base station, scheduling identifiers of the one or more other terminals, or information regarding a frame to transmit signals; and
   by the one or more other terminals.

8. The method of claim 7, wherein transmitting the response signal further comprises:
   transmitting the response signal to the other terminal if the contention index is a highest contention index among contention indexes.

9. The method of claim 7, wherein:
   the response signal contains contention indexes of the one or more other terminals; and
   the contention indexes of the one or more other terminals, contained in the response signal, are used by the one or more other terminals to select a resource for the discovery, based on the contention indexes.

10. The method of claim 6, wherein:
    the request signal is received in a first interval of a frame for the discovery;
    the response signal is transmitted in a second interval of the frame for the discovery; and
    the discovery for the D2D communication is performed in a third interval of the frame for the discovery.

11. A terminal of device-to-device (D2D) communication comprising:

a communication unit configured to perform data communication with a base station and one or more other terminals; and a controller controlling the communication unit, the controller is configured to:

transmit a request signal including a contention index of the terminal on a wireless resource;

select, if a response signal is received on a wireless resource in response to the request signal, a discovery resource corresponding to the contention index of the terminal based on the response signal; and perform discovery for the D2D communication using the selected discovery resource.

12. The terminal of claim 11, wherein the contention index is determined:

based on at least one of information regarding the contention index received from the base station, a scheduling identifier of the terminal, and information regarding a frame to transmit signals; or by the terminal.

13. The terminal of claim 11, wherein the controller is further configured to:

abandon the selected discovery resource if the response signal is not received on the wireless resource in response to the request signal.

14. The terminal of claim 11, wherein the controller is further configured to:

compare the contention index of the terminal with contention indexes of the one or more other terminals, contained in the response signal; and select the discovery resource corresponding to the wireless resource if the contention index of the terminal is higher than the contention indexes of the one or more other terminals.

15. The terminal of claim 11, wherein:

the request signal is transmitted in a first interval of a frame for the discovery;

the response signal is received in a second interval of the frame for the discovery; and the controller is further configured to perform the discovery for the D2D communication in a third interval of the frame for the discovery.

16. A terminal configured to perform device-to-device (D2D) communication comprising:

a communication unit configured to perform data communication with a base station (eNB) and one or more other terminals; and a controller controlling the communication unit, the controller is configured to:

receive a request signal including a contention index of an other terminal on a wireless resource;

transmit a response signal on the wireless resource based on information contained in the received request signal; and perform discovery for the D2D communication with the other terminal using a discovery resource corresponding to the contention index of the other terminal.

17. The terminal of claim 16, wherein the contention indexes is determined:

based on at least one of information regarding the each of the contention indexes received from the base station, scheduling identifiers of the one or more other terminals, or information regarding a frame to transmit signals; or by the one or more other terminals.

18. The terminal of claim 17, wherein the controller is further configured to control the communication unit to transmit the response signal to the other terminal if the contention index is a highest priority contention index among contention indexes.

19. The terminal of claim 17, wherein:

the response signal contains contention indexes of the one or more other terminals; and the contention indexes of the one or more other terminals, contained in the response signal, are used by the one or more other terminals to select a resource for the discovery based on the contention indexes.

20. The terminal of claim 16, wherein:

the request signal is received in a first interval of a frame for the discovery;

the response signal is transmitted in a second interval of the frame for the discovery; and the discovery for the D2D communication is performed in a third interval of the frame for discovery.

* * * * *